United States Patent [19]

Abraham

[11] Patent Number: 4,999,405

[45] Date of Patent: Mar. 12, 1991

[54] COMPOSITIONS OF AND A METHOD FOR PREPARING HIGH-TEMPERATURE OIL RESISTANT ELASTOMERS FROM HYDROGENATED BUTADIENE ALKENYLPYRIDINE COPOLYMERS

[75] Inventor: Tonson Abraham, Elyria, Ohio

[73] Assignee: The B. F. Goodrich Company, Akron, Ohio

[21] Appl. No.: 450,945

[22] Filed: Dec. 14, 1989

[51] Int. Cl.$^5$ ................................................ C08F 8/04
[52] U.S. Cl. ................................. 525/338; 525/327.1; 525/339
[58] Field of Search ............................... 525/338, 339

[56] References Cited

U.S. PATENT DOCUMENTS

| | | |
|---|---|---|
| 3,416,899 | 12/1968 | Schiff . |
| 3,531,450 | 12/1970 | Yoshimoto et al. . |
| 3,625,927 | 12/1971 | Yoshimoto et al. . |
| 3,673,281 | 6/1972 | Bronstert et al. . |
| 3,766,300 | 10/1973 | De La Mare . |
| 3,988,504 | 10/1976 | Halasa . |
| 4,098,991 | 7/1978 | Kang .................................. 525/339 |

OTHER PUBLICATIONS

Chemical Abstracts vol. 68, 1968, pp. 7696, 79692n.
A paper entitled "Oil-Resistant Rubbers from 2--Methyl Vinyl Pyridine," J. E. Pritchard & M. H. Opheim, Industrial & Engineering Chem., 1954, vol. 46, pp. 2242-2245.
A paper entitled "Butadiene-2-Methyl-5-Vinylpyridine Rubbers for General Purpose Use," H. E. Railsbach & C. C. Biard, Industrial Eng. Chem., 1957, vol. 49, pp. 1043-1050.
A paper entitled "Pyridinium High Polymers—A New Class of Oil-Resistant Synthetic Rubbers," W. B. Reynold, J. E. Pritchard, M. H. Opheim, & G, Kruas, Proceedings of the Third Tech. Conf., 1956, pp. 226-240.

Primary Examiner—Bernard Lipman
Attorney, Agent, or Firm—Daniel J. Hudak; David P. Dureska; William A. Skinner

[57] ABSTRACT

A random copolymer is formed by emulsion polymerization from two monomeric classes. The first monomeric class is a conjugated diene or substituted conjugated diene containing from four to about eight carbon atoms. The second monomeric class is of the general formula

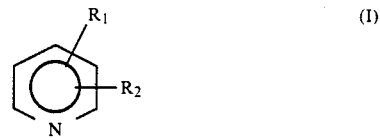

wherein $R_1$ is an alkenyl group containing from about two to about eight carbon atoms, and $R_2$ is hydrogen or an alkyl group containing from one to about eight carbon atoms.

The second monomeric class can be replaced with up to about 20 percent by weight of the general formula $CH_2=CR_3C$ wherein $R_3$ is hydrogen or $-CH_3$ $_l$ and $X$ is $-OOR_4$, $-ONR_5R_6$ or $-OOR_7OR_4$ wherein $R_4$ is an alkyl group containing from one to about four carbon atoms, $-CH_2CF_3$ or $-CH_2CF_2CF_2H$, $R_5$ and $R_6$ are alkyl groups independently containing from one to about four carbon atoms and $R_7$ is an alkylene group containing from 1 to about 4 carbon atoms. The random copolymer thus obtained is hydrogenated in the presence of a transition metal catalyst and a trialkyl aluminum and further in the absence of Lewis acids such as boron trifluoride or boron trifluoride etherate. Additionally, at least one complexing agent is employed for the transition metal catalyst.

34 Claims, No Drawings

COMPOSITIONS OF AND A METHOD FOR PREPARING HIGH-TEMPERATURE OIL RESISTANT ELASTOMERS FROM HYDROGENATED BUTADIENE ALKENYLPYRIDINE COPOLYMERS

FIELD OF THE INVENTION

The present invention relates to compositions and to the preparation of random copolymers of conjugated dienes and alkenyl pyridines, optionally, in the presence of a substituted acrylate ester, substituted acrylamide, fluoroalkyl acrylate esters or alkoxyalkyl acrylates or methacrylates. The random copolymer so obtained is then hydrogenated so at least 95 percent of the aliphatic olefinic double bonds are saturated.

BACKGROUND

Nitrile-butadiene rubber (NBR) is an oil resistant elastomer used in automotive applications. It has poor high temperature properties. The recommended continuous use temperature is between 100°–125° C. Commercially available hydrogenated NBR (HNBR) addresses the need for a higher use temperature, oil resistant elastomer having a continuous use temperature up to about 150° C.

Removal of the backbone unsaturation in NBR by hydrogenation increases the heat resistance of the polymer while maintaining its low temperature and oil resistance properties. HNBR is mainly a random copolymer of ethylene and acrylonitrile. HNBR compositions that contain up to 40 weight percent bound acrylonitrile and 60 weight percent hydrocarbon segments have high oil resistance and good low temperature properties. Higher acrylonitrile content in the copolymer would further increase oil resistance, but would be detrimental to low temperature properties.

U.S. Pat. No. 3,416,899 (Schiff, Dec. 17, 1968) relates to improved gel compositions useful as incendiary fuels, as solid fuels for heating, as a fracturing liquid for subterranean formations, and the like. In another aspect, this reference relates to the preparation of hydrocarbon gel compositions by hydrogenating a hydrocarbon solution of an unsaturated rubbery polymer in the presence of a catalyst comprising a reducing metal compound and a salt of a Group VIII metal.

U.S. Pat. No. 3,766,300 (De La Mare, Oct. 16, 1973) discloses a process for the hydrogenation of copolymers prepared from conjugated dienes and certain copolymerizable polar monomers such as vinyl pyridines, acrylonitriles, and alpha-olefin oxides which comprises an initial step of forming a complex between at least one Lewis acid and the polar portions of the copolymer and thereafter subjecting the complex to hydrogenation. More particularly, this reference is especially concerned with a process for the hydrogenation of block copolymers derived from these monomers.

Japanese Patent No. 13,615 (Aug. 2, 1967; filed Feb. 15, 1963) relates to copolymers of butadiene and vinyl pyridine that were reduced to give waterproof, stable reduced copolymers. These products were useful for coating pills. The reduced copolymers were obtained by the catalytic hydrogenation in the presence of Raney nickel catalyst.

A paper titled "Oil-Resistant Rubbers from 2-Methyl Vinyl Pyridine," James E. Pritchard and Milton H. Opheim, *Industrial and Engineering Chemistry*, Volume 46, No. 10, pages 2242–2245, relates to quaternization of liquid polymers. Copolymers of butadiene and 2-methyl-5-vinyl pyridine (MVP) react with quaternizing agents to form polymeric salts of the type:

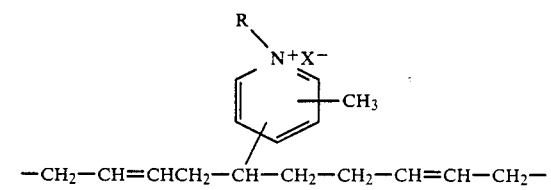

$$-CH_2-CH=CHCH_2-CH-CH_2-CH_2-CH=CH-CH_2-$$

where R is an aliphatic or aromatic radical and X represents halide, alkyl sulfate, or aryl sulfonate groups.

SUMMARY OF THE INVENTION

Random copolymer compositions which function as oil-resistant elastomers are prepared by the emulsion polymerization of two monomeric classes. The first monomeric class consists of a conjugated diene or branched conjugated diene or mixtures thereof containing from 4 to 8 carbon atoms. The second monomeric class is characterized by the formula

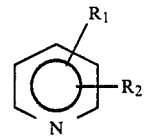

(I)

wherein $R_1$ is an alkenyl group containing from about 2 to about 8 carbon atoms, and $R_2$ is hydrogen or an alkyl group containing from 1 to about 8 carbon atoms. The second monomeric class can be replaced with up to about 20 percent by weight of $CH_2\!=\!CR_3CX$ wherein $R_3$ is hydrogen or methyl and X is $-OOR_4$, $-ONR_5R_6$ or $OOR_7OR_4$ wherein $R_4$ is an alkyl group containing from 1 to about 4 carbon atoms, $-CH_2CF_3$ or $-CH_2CF_2CF_2H$, $R_5$ and $R_6$ are alkyl groups independently containing from 1 to about 4 carbon atoms and $R_7$ is an alkylene group containing from 1 to about 4 carbon atoms. The random copolymer so formed is then hydrogenated using a transition metal catalyst and at least one complexing agent.

DETAILED DESCRIPTION OF THE INVENTION

This invention deals with compositions and a method for preparing high temperature, oil-resistant elastomers by the copolymerization of two monomeric classes followed by the hydrogenation of the copolymer. Direct polymerization of ethylene with acrylonitrile to give HNBR is not feasible due to the difference in reactivities of the monomers under the copolymerization conditions. This is generally true in the case of copolymerization of ethylene with any polar alpha, beta unsaturated monomer. Direct copolymerization of ethylene and polar alpha, beta unsaturated monomers (including acrylonitrile) using transition metal catalysts have been unsuccessful.

Free radical polymerization at very high pressures, ca 2000 atmospheres, results in comparable reactivity for ethylene and acrylonitrile, but the polymerization process is plagued with side reactions that preclude high molecular weight polymer formation. The polymer obtained thus is a poor candidate for cross-linking to an elastomer.

Free radical polymerization can be performed at lower pressure, ca 60 atmospheres, in a solvent using a Lewis acid as the complexing agent for the polar monomer, acrylonitrile. As an almost perfectly alternating copolymer is formed, the low temperature properties are poorer than the corresponding random copolymer. Also, tensile strength is reduced in the perfectly alternating copolymer, due to the lack of polyethylene segments which is responsible for the high strength of the random copolymer.

Conjugated dienes readily copolymerize with polar alpha, beta monomers in emulsion to give high molecular weight copolymers. Subsequent hydrogenation of the backbone unsaturation in these polymers is an alternate route to copolymers of ethylene with polar alpha, beta unsaturated monomers.

The first monomeric class is a straight chain conjugated diene, a branched chain conjugated diene, or mixtures thereof. This diene contains from 4 to 8 carbon atoms. Examples of straight chain dienes are 1,3-butadiene, 1,3-pentadiene, 1,3-hexadiene, 1,4-hexadiene, 1,3-heptadiene, 2,4-heptadiene, 1,3-octadiene, 2,4-octadiene, and 3,5-octadiene. Some representative examples of branched chain dienes are isoprene, 2,3-dimethyl-1,3-butadiene, 2-methyl-1,3-hexadiene, 3-methyl-1,3-hexadiene, 2-methyl-2,4-hexadiene, 3-methyl-2,4-hexadiene, 2,3-dimethyl-1,3-pentadiene, 2,4-dimethyl-1,3-pentadiene, 2-ethyl-1,3-pentadiene, and 3-ethyl-1,3-pentadiene. The preferred dienes for the practice of this invention are butadiene and isoprene.

The second monomeric class is of the general formula

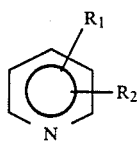

(I)

where $R_1$ is an alkenyl group containing from about 2 to about 8 carbon atoms, preferably from about 2 to 6, and most preferably from 2 to about 4 carbon atoms. Particularly, $R_1$ is vinyl. $R_2$ is hydrogen or an alkyl group containing from 1 to about 8 carbon atoms. When $R_2$ is an alkyl group, it preferably contains from 1 to about 6 carbon atoms and most preferably from 1 to about 4 carbon atoms. When $R_2$ is alkyl, a particular group is methyl.

The general formula (I) of the second monomeric class can be replaced with up to about 20 percent by weight of general formula (II) $CH_2=CR_3CX$. $R_3$ is hydrogen or methyl and X is $-OOR_4$, $-ONR_5R_6$ or $-OOR_7OR_4$ wherein $R_4$ is an alkyl group containing from 1 to about 4 carbon atoms, $-CH_2CF_3$ or $-CH_2CF_2CF_2H$, $R_5$ and $R_6$ are alkyl groups independently containing from 1 to about 4 carbon atoms and $-OOR_7OR_4$ is an alkylene group containing from 1 to about 4 carbon atoms. When $R_3$ is hydrogen or methyl and X is $-OOR_4$, some examples of general formula II are acrylates, methacrylates, fluorinated acrylates or fluorinated methacrylates. When $R_3$ is hydrogen or methyl and X is $-ONR_5R_6$, general formula II may be tertiary acrylamides or tertiary methacrylamides. When X is $-OOR_7OR_4$, preferably $R_7$ is an alkylene group containing from 1 to about 2 carbon atoms and $R_4$ is an alkyl group containing from 1 to about 2 carbon atoms.

Preferably at least 3 percent of general formula (II) is present in the second monomeric class and most preferably at least 7 percent of general formula (II) is present in the second monomeric class.

The hydrogenated random copolymers of this invention have utility as high temperature oil-resistant elastomers. The hydrogenated random copolymers of this invention may be solids or liquids, depending on molecular weight. These hydrogenated random copolymers serve as thermooxidatively stable oil resistant elastomers or as impact modifiers for plastics. Products made from these elastomers find use for seals, gaskets, and hoses. The liquid polymers can be used as processing aids and/or modifiers in rubber and plastic compounding.

Conjugated 1,3-dienes copolymerize readily with alpha,beta unsaturated monomers other than acrylonitrile. Examples of two such monomer classes are vinyl pyridine or acrylates. These copolymers, like NBR, are also oil resistant. In addition, hydrogenation of the polymer backbone of the conjugated diene/vinyl pyridine and conjugated diene/acrylate copolymer is possible with inexpensive homogeneous catalysts based on iron, cobalt or nickel. Hence, high temperature oil resistant elastomers can be obtained at a cost lower than that of HNBR.

The first step in the preparation of an oil-resistant elastomer is in forming a random copolymer of the two monomeric classes. The random copolymer is formed by emulsion polymerization. The weight ratio of the first monomeric class:the second monomeric class is from about 25–85:75–15, preferably 40–60:60–40, and most preferably 55–60:45–40.

The random copolymer is made in a conventional manner. That is, the above-noted monomers are added to suitable amounts of water in a polymerization vessel along with one or more conventional ingredients and polymerized. The amount of polymerized solids or particles is generally from about 15 percent to about 50 percent with from about 25 to about 35 percent by weight being desired. The temperature of polymerization is generally from about 5° C. to about 80° C. with from about 5° C. to about 20° C. being preferred. Typically in excess of 60 percent and usually from about 70 percent to about 95 percent conversion is obtained with from about 80 percent to about 85 percent conversion being preferred. The polymerization is generally initiated by free radical catalysts which are utilized in conventional amounts. Examples of such catalysts include organic peroxides and hydroperoxides such as benzoyl peroxide, dicumyl peroxide, cumene hydroperoxide, paramenthane hydroperoxide, and the like, used alone or with redox systems; diazo compounds such as azobis-isobutyronitrile, and the like; persulfate salts such as sodium, potassium, and ammonium persulfate, used alone or with redox systems; and the use of ultraviolet light with photo-sensitive agents such as benzophenone, triphenylphosphine, organic diazos, and the like.

Inasmuch as the random copolymers are prepared via an emulsion latex polymerization route, anionic emulsifying aids are utilized. Thus, various conventional anionic surfactants known to the art as well as to the literature are utilized. Generally, any suitable anionic surfactant can be utilized such as those set forth in McCutcheons, "Detergents and Emulsifiers," 1978, North American Edition, Published by McCutcheon's Division, MC Publishing Corp., Glen Rock, N.J., U.S.A., as well as the various subsequent editions thereof, all of which are hereby fully incorporated by reference. Desirably, various conventional soaps or detergents are utilized such as a sodium alkyl sulfate, wherein the alkyl has from 8 to 22 carbon atoms such as sodium lauryl sulfate, sodium stearyl sulfate, and the like, as well as various sodium alkyl benzene sulfonates, wherein the alkyl has from 8 to 22 carbon atoms such as sodium dodecyl benzene sulfonate, and the like. Other anionic surfactants include sulfosuccinates and disulfonated alkyl benzene derivatives having a total of from 8 to 22 carbon atoms. Various phenyl type phosphates can also be utilized. Yet other anionic surfactants include various fatty acid salts having from 12 to 22 carbon atoms as well as various rosin acid salts wherein the salt portion is generally lithium, sodium, potassium, ammonium, magnesium, and the like. The selection of the anionic surfactant generally depends on the pH of the polymerization reaction. Hence, fatty acid salts and rosin acid salts are not utilized at low pH values.

The amount of the surfactant can vary depending upon the size of random copolymer particles desired, but typically is from about 1 percent to about 6 percent and desirably from about 2 percent to about 3 percent by weight for every 100 parts by weight of the random copolymer forming monomers.

Other anionic emulsifying aids are various anionic electrolytes which control particle size by controlling the solubility of the soap. Examples of various conventional electrolytes generally include sodium, potassium, or ammonium naphthalene sulfonates. Other suitable electrolytes include sodium sulfate, sodium carbonate, sodium chloride, potassium carbonate, sodium phosphate, and the like. The amount of electrolyte is generally from about 0.1 to about 1.0 parts by weight and preferably from about 0.2 to about 0.5 parts by weight for every 100 parts by weight of the random copolymer forming monomers.

Molecular weight modifiers are also utilized to maintain the molecular weight within desirable limits as otherwise the viscosity of the polymer would be exceedingly high for subsequent handling, processing, and the like. Generally, known conventional molecular weight modifiers can be utilized such as various mercaptans which have from about 8 to about 22 carbon atoms, generally in the form of an alkyl group. Various sulfide compounds can also be utilized such as diisopropylxanthogendisulfide and di-sec-butylxanthogendisulfide. The amount of the molecular modifiers is generally an effective amount such that the Mooney viscosity, that is $ML_4$ @ 100° C. is from about 10 to about 120 and desirably from about 20 to about 80.

Yet another conventional emulsion latex additive is various short stop agents which are added generally to stop the polymerization and to tie up and react with residual catalysts. The amount of the short stop agents is from about 0.05 to about 1.0 parts by weight per 100 parts by weight of said random copolymer forming monomers. Examples of specific short stop agents include hydroxyl ammonium sulfate, hydroquinone and derivatives thereof, e.g., ditertiaryamylhydroquinone, various carbamate salts such as sodium diethyldithiocarbamate, various hydroxyl amine salts, and the like. Various antioxidants can be added and such are known to the art as well as to the literature including various phenolic type antioxidants such as di-tert-butyl-para-cresol, various diphenylamine antioxidants such as octylated diphenylamine, various phosphite antioxidants such as trisnonyl phenyl phosphite, and the like. Once the short stop has been added to the latex solution, excess monomer is stripped from the resultant latex, as for example by steam.

According to the concepts of the present invention, a cationic coagulant polymer is utilized to coagulate the anionic emulsifying aids such as the various anionic surfactants and the various anionic electrolytes utilized. Polymeric cationic type coagulants are utilized according to the present invention inasmuch as they have a positive site which generally reacts with the negative or anionic site of the surfactant, electrolyte, etc., and thereby neutralize the same and render it innocuous. That is, according to the concepts of the present invention, the anionic emulsifying aids are not physically removed but rather are chemically reacted with a cationic polymeric coagulant to form an adduct which is generally dispersed throughout the random copolymer particle.

An important aspect of the present invention is that large stoichiometrically equivalent amounts of cationic polymeric coagulants are utilized. That is, large weight equivalents are required in order to yield a random copolymer having improved properties. Generally, from about 0.75 to about 1.5 weight equivalents, desirably from about 0.85 to about 1.25, and preferably from about 0.95 to about 1.05 weight equivalents of the cationic polymeric coagulant is utilized for every weight equivalent of said anionic emulsifying aids. Equivalent weight amounts less than those set forth herein do not result in effective neutralization, tying up, or negate the effect which the various anionic emulsifying aids have upon the properties of the dried rubber particles.

The cationic polymeric coagulants utilized in the present invention generally contain a tetravalent nitrogen and are sometimes referred to as polyquats. Cationicity of the quaternary nitrogen is generally independent of pH, although other parts of the polymer molecule may exhibit sensitivity to pH such as hydrolysis of ester linkages. Typically, cationic polymers are prepared either by quaternization of poly(alkylene polyamines), poly(hydroxyalkylene polyamines), or poly(carbonylalkylene polyamine) with alkyl halides or sulfates, or by step-growth polymerization from dialkylamines, tetraalkyl amines, or derivatives thereof, with suitable bifunctional alkylating agents, and with or without small amounts of polyfunctional primary amines (such as ammonia, ethylene diamines, and others) for molecular weight enhancement. Polyamines produced from ammonia and ethylene dichloride, quaternized with methyl chloride, and polyquaternaries produced directly from dimethylamine and 1-chloro-2,3-epoxypropane are generally of commercial significance. Epichlorohydrin reacts with ammonia and primary, secondary, or polyfunctional amines to form polyamines or polyquats. The polyamines can be subsequently quaternized to yield a cationic polymeric coagulant of the present invention. As known to those skilled in the art and to the literature, literally hundreds of cationic polymeric coagulants exist and generally the same can be utilized in the present invention. Examples of specific polymeric cationic coagulants include poly(2-hydroxypropyl-1-N-methylammonium chloride), poly(2-hydroxypropyl-1,N,N-dimethylammonium chloride), poly(diallyldimethylammonium chloride), poly(N,N-dimethylaminoethyl methacrylate) quaternized, and a quaternized polymer of epichlorohydrin and a dialkylamine wherein the alkyl group has from 1 to 5 carbon atoms with methyl being preferred. The method of preparing cationic polymeric coagulants, general types of such compounds as well as specific individual compounds are set forth in the following documents which are hereby fully incorporated by reference with regard to all aspects thereof:

*Encyclopedia of Polymer Science and Technology*, John Wiley & Sons, New York, 1987, Volume 11, 2nd Edition, pages 489–503.

*Encyclopedia of Polymer Science and Technology*, John Wiley & Sons, New York, 1987, Volume 7, 2nd Edition, pages 211–229.

*Kirk Othermer's Encyclopedia of Chemical Technology*, 3rd Edition, Volume 10, John Wiley & Sons, New York, 1980, pages 489–523.

A text entitled *Commercial Organic Flocculants*, Josef Vostrcil and Frantisek Juracka, Noyes Data Corporation, Park Ridge, N.J., 1976, in its entirety.

The cationic polymeric coagulants utilized in the present invention generally have a molecular weight of from about 1,000 to about 10,000,000.

According to the present invention, the cationic polymeric coagulant treated random copolymer latex generally results in a slurry of rubber crumbs in a clear aqueous liquid. The crumbs contain the various anionic emulsifying aids physically incorporated therein. Such crumbs can be separated in any conventional manner as by filtering. Inasmuch as the anionic emulsifying aids have been rendered innocuous, multiple washing steps or other expensive, tedious process steps such as solvent extraction are not utilized.

The random copolymer of the present invention once dried as by conventional means, have improved properties such as good water resistance, good adhesion properties, non-interference with cure systems when cured, reduce fouling of molds during the manufacture of parts, improved electrical insulating properties, and the like. Such polymers can accordingly be utilized as adhesives, that is polymeric adhesives, binders, films, e.g., electrical insulating films, coatings such as for electrical circuit boards along with other conventional coating additives and fillers known to the art and to the literature, and the like. Suitable adhesive uses include metal-to-metal adhesion, metal-to-fabric adhesion, metal-to-plastic adhesion, and the like. Additionally, the polymers of this invention have utility in the automotive area such as in hoses, gaskets, seals, and timing belts.

The random copolymer can be prepared with a mercaptan chain transfer agent composition comprising (a) at least one mercaptan chain transfer agent and (b) at least one non-polymerizable material which is miscible with the mercaptan chain transfer agent. Suitable mercaptans include water soluble mercaptans such as 2-mercaptoethanol, 3-mercaptopropanol, thiopropyleneglycol, thioglycerine, thioglycolic acid, thiohydracrylic acid, thiolactic acid, and thiomalic acid, and the like. Suitable non-water soluble mercaptans include isooctyl thioglycolate, n-butyl 3-mercaptopropionate, n-butyl thioglycolate, glycol dimercaptoacetate, trimethylolpropane trithioglycolate, alkyl mercaptans, and the like. The preferred mercaptans are 2-mercaptoethanol and t-dodecylmercaptan, however, any chain transfer agent having a mercapto (—SH) group would be acceptable.

The chain transfer composition, in addition to the mercaptan, may contain at least one non-polymerizable material which is miscible with the mercaptan and is substantially insoluble in water. The term non-polymerizable as used herein means that the material does not form a part of the random copolymer chain in the sense that a traditional comonomer would form. The non-polymerizable material may, in some cases, graft polymerize onto the random copolymer chain but this is not normally considered a copolymer. The term substantially insoluble in water as used in this specification means that the material has less than 5 percent solubility in water. The non-polymerizable material may be a monomer, oligomer or a polymer. Suitable non-polymerizable materials include dioctyl phthalate, low molecular weight poly(caprolactone), polysilicones, esters of glycerols, polyesters, water insoluble esters of fatty acids with —OH terminated polyoxyethylene and polyoxypropylene, esters of polyols, esters of monoacids and polyacids, esters of organic polyphosphates, phenyl ethers, ethoxylated alkylphenols, sorbitan monostearate and sorbitan monooleate and other sorbitol esters of fatty acids. The choice of material is not critical as long as the material is non-polymerizable with the monomers and is substantially insoluble in water.

The chain transfer composition must contain at least enough non-polymerizable material to encapsulate the mercaptan chain transfer agent. This amount varies according to the type and amount of chain transfer agent used. Usually, the chain transfer composition must contain at least an equal amount in weight of non-polymerizable material as chain transfer agent in order to encapsulate or host the chain transfer agent. Preferably, the composition contains at least twice as much weight of non-polymerizable material as chain transfer agent. Other non-essential ingredients may be used in the chain transfer compositions of this invention but are not preferred.

The chain transfer compositions are formed by mixing the two essential ingredients together. The method used to mix the ingredients is not critical and may be any of the known methods used by those skilled in the art. The ingredients may even be charged to the polymerization reactor and mixed before adding the other polymerization ingredients but is preferably mixed outside the reactor.

Because of the detrimental effects that mercaptans, such as 2-mercaptoethanol have on colloidal stability, it is necessary to mix the 2-mercaptoethanol with the non-polymerizable material before adding it to the reaction medium. The non-polymerizable material serves as a host material for the chain transfer agent. This procedure surprisingly eliminates the adverse effects of 2-mercaptoethanol on colloidal stability. It is believed that the non-polymerizable material averts the adverse effect of 2-mercaptoethanol on colloidal stability via encapsulation, complexation or interaction and, thus, allows relatively high levels of 2-mercaptoethanol to be introduced to the reaction medium prior to the start of polymerization. The term "encapsulation" as used herein is not intended as the traditional meaning of encapsulation which is to coat or contain and the result is a heterogeneous system. The chain transfer composition of this invention is homogeneous.

The level of chain transfer composition used to make the random copolymer will be described in terms of the level of mercaptan in the composition. The level of mercaptan used is greater than 0.03 part by weight per 100 parts by weight of diene monomer. The preferred levels of mercaptan range from about 0.03 to about 5.00 parts by weight per 100 parts of monomer, and, preferably, from 0.10 to 1.50 parts.

When high amounts of mercaptan, such as 2-mercaptoethanol, are used, it is desirable to not charge the entire amount of chain transfer agent at the beginning of polymerization since 2-mercaptoethanol has a diminishing effect on molecular weight above about the 1.5 parts level. Therefore, if, for example, 3.0 parts were used, it would be advisable to add only up to 1.5 parts at the beginning of polymerization and to gradually add the remainder during polymerization. Amounts added at the beginning which are greater than 1.5 parts do not result in colloidal instability. However, for the most efficient use of chain transfer agent, it is preferred to not add more than 1.5 parts before the beginning of polymerization. This preferred initial level could, of course, be different for different mercaptans. The above described preferred procedure is for 2-mercaptoethanol.

If less than 0.25 part by weight of chain transfer agent is used, then all of the chain transfer agent will be added in the form of the chain transfer composition before the beginning of polymerization. If more than 0.25 part is used, then at least 0.25 part will be added in the form of the chain transfer composition before the beginning of polymerization and the remainder may be added later. To gain the most efficiency of the chain transfer agent, no more than 1.5 parts by weight should be added before the start of polymerization. For best results, at least 50 percent of the chain transfer agent, preferably 100 percent, is added to the polymerization medium prior to the start of polymerization. Any amount not added at the start and not encapsulated should be added after the polymerization has reached about 10 percent conversion to maintain collodial stability. Except for the use of the chain transfer composition, the polymerization is much the same as in any conventional polymerization of a diene monomer in an aqueous medium.

Another class of chain-transfer agents that are used in the process of this invention are mercapto organic compounds having at least one ether linkage that have the structural formula $$X-(CH_2)_m-(OY)_n-SH$$

wherein X represents hydrogen or —SH, Y represents an alkylene group having 1 to 6 carbon atoms, and m and n each represents a number in the range of 1 to 10.

A preferred group of ether linkage chain-transfer agents includes mercapto organic compounds that have the structural formula $$X-(CH_2)_{m'}-(OY')_{n'}-SH$$

wherein X represents hydrogen or —SH, Y' represents an alkylene group having 2 to 4 carbon atoms, and m' and n' each represents a number in the range of 2 to 4.

Illustrative of the ether linkage chain-transfer agents that can be used in the practice of this invention are the following compounds:
mercaptomethyl ethyl ether,
2-mercaptoethyl ethyl ether,
2-mercaptoethyl propyl ether,
2-mercaptoethyl butyl ether,
3-mercaptopropyl methyl ether,
3-mercaptopropyl ethyl ether,
3-mercaptopropyl butyl ether,
2-mercaptopropyl isopropyl ether,
4-mercaptobutyl ethyl ether,
bis-(2-mercaptoethyl) ether,
bis-(3-mercaptopropyl) ether,
bis-(4-mercaptobutyl) ether,
(2-mercaptoethyl) (3-mercaptopropyl) ether,
(2-mercaptoethyl) (4-mercaptobutyl) ether,
ethoxypolypropylene glycol mercaptan,
methoxypolyethylene glycol mercaptan, and the like and mixtures thereof.

Among the preferred ether linkage chain-transfer agents are 2-mercaptoethyl ethyl ether and bis-(2-mercaptoethyl) ether.

The amount of the ether linkage chain-transfer agent that is used in the polymerization reaction is that which will provide a polymer having the desired molecular weight or degree of polymerization. In most cases from 0.01 percent to 2 percent by weight, based on the weight of the monomer component, is used. When a low molecular weight product that has a relative viscosity in the range of 1.20 to 1.60 is desired, the amount of chain transfer agent used is preferably in the range of 0.25 percent to 1.75 percent by weight, based on the weight of the monomer. Amounts in the range of 0.05 percent to 0.15 by weight, based on the weight of the monomer, are preferably used to produce polymers having high molecular weights.

The invention will be better understood by reference to the following examples.

The below Table I shows the preparation of a random copolymer of butadiene and 2-vinylpyridine. Items 1 through 9 are initially charged into a 15 gallon reactor under nitrogen and cooled to 5° C. Polymerization is initiated by adding items 10 through 12. These three items promote peroxide breakdown thereby generating initiator radicals. The conversion is monitored by measuring total solids content every hour. At 35 percent conversion, the additional items 1 through 5 are added. After 20 hours, at 5° C., 80 percent conversion is obtained and the reaction is terminated by adding item 13. After removal of volatiles, the latex is coagulated in hot water (70° C.) containing 1.5 weight percent of aluminum sulfate to form a crumb. The crumb is filtered, washed with water and dried in air at 100° C. for 4 hours.

TABLE I

EXAMPLE 1

| Item | Material | Purity % | Parts by Weight Added Initially | Added at 35% Conv. | Total |
|---|---|---|---|---|---|
| 1 | Soft Water | 100 | 186.48 | 12.83 | 199.31 |
| 2 | Sipex SB Emulsifier | 30 | 2.0 | 1.0 | 3.0 |
| 3 | Sodium Naphthalene Sulfonate Secondary Emulsifier | 100 | .67 | .33 | 1.0 |
| 4 | Sodium Carbonate Electrolyte | 100 | .16 | .08 | .24 |
| 5 | Sulfole 120 Chain Transfer Agent | 100 | .18 | .12 | .30 |

TABLE I-continued

EXAMPLE 1

| Item | Material | Purity % | Parts by Weight Added Initially | Added at 35% Conv. | Total |
|---|---|---|---|---|---|
| 6 | Cumene Hydroperoxide Initiator | 82.5 | .115 | — | .115 |
| 7 | Sodium Hydrosulfite Oxygen Scavenger | 100 | .007 | — | .007 |
| 8 | Butadiene Monomer | 100 | 55 | — | 55 |
| 9 | 2-Vinylpyridine Monomer | 100 | 45 | — | 45 |
| 10 | Trisodium Ethylenediamine Tetraacetate Trihydrate Complexing Agent for iron salts | 100 | .01 | — | .01 |
| 11 | Sodium Ferric Ethylene Diamine Tetraacetate | 100 | .015 | — | .015 |
| 12 | Sodium Formaldehyde Sulfoxylate Reducing Agent for Ferric Salts | 100 | .105 | — | .105 |
| 13 | Hydroxyl Ammonium Sulfate Short Stop | 100 | — | — | .3 |

Examples 2 through 5 essentially follow the procedure of Example 1 except for the monomers and level of monomers employed. Table II outlines Examples 2 through 5.

TABLE II

| Example No. | First Monomer | Second Monomer | Ratio of First & Second Monomer |
|---|---|---|---|
| 2 | Butadiene | 2-vinylpyridine | 40:60 |
| 3 | Isoprene | 2-vinylpyridine | 50:50 |
| 4 | Isoprene | 4-vinylpyridine | 55:45 |
| 5 | 2,3-dimethyl 1,3-butadiene | 2-methyl-5-vinyl-pyridine + 3% methylmethacrylate | 50:50 |

The random copolymer obtained has a high cis-trans-1,4 microstructure rather than 1,2 and/or 3,4 microstructure (depending upon the diene). The combined mole percent of cis-trans 1,4-microstructure to vinyl microstructure has been determined to be 3.7:1 by proton magnetic resonance when the copolymers have a weight ratio of 60 percent butadiene to 40 percent 2-vinyl-pyridine by weight. The cis and trans microstructure get hydrogenated to linear polyethylene segments which are responsible for the improved mechanical properties of the elastomer due to stretch crystallinity (A. H. Weinstein, Rubber Chemical Technology 57, 203 (1984)).

The random copolymer once obtained is then subjected to hydrogenation in the presence of a transition metal catalyst and trialkylaluminum catalyst in the presence of at least one complexing agent and further in the absence of BF3 or BF3 etherate.

Either a homogeneous or a heterogeneous catalyst may be used for the hydrogenation although a homogeneous catalyst is preferred. Since a homogeneous catalyst dissolves in solution, good contact is obtained with the random copolymer. The homogeneous catalysts are transition metal catalysts of either iron, cobalt, or nickel. These metals are present as halides, acetates, or acetylacetonates. Other homogeneous catalysts that can be employed are palladium, platinum or rhodium present as tetrakistriphenylphosphine palladium (0), tetrakistriphenylphosphine platinum (0) or tristriphenylphosphinerhodium chloride.

Conventional homogeneous catalysts based on, for example, reduced cobalt salts are inexpensive compared to rhodium or palladium, but are only suitable for the hydrogenation of hydrocarbon polymers, e.g., a nickel catalyst is commercially used in the hydrogenation of Krayton, a triblock butadiene-styrene-butadiene copolymer. Hydrogenation of the polymer backbone of NBR is not possible using these catalysts, as the nitrile group in NBR acts as a catalyst poison, and, in some cases is itself reduced.

HNBR is commecially synthesized by the hydrogenation of NBR in solution. The relatively high cost of HNBR compared to NBR is partly due to the solution hydrogenation process, the major contribution to cost being the catalyst (rhodium or palladium).

The transition metal catalyst is employed with trialkyl aluminum, wherein the alkyl group contains from 1 to about 4 carbon atoms, which functions as a reducing agent. Other reducing agents that can be employed are dialkyl aluminum hydride, the dialkyl aluminum alkoxides of 1 to 4 carbon atoms, sodium borohydride, and lithium aluminum hydride. Additionally, other reductants are alkyl lithium, dialkyl magnesium, and alkyl magnesium halide wherein the alkyl groups are from 1 to 4 carbon atoms, and the halide is chloride or bromide.

The mole ratio of transition metal catalyst: reducing agent is usually from 1:10, preferably 1:6, and most preferably from 1:4.

The transition metal catalyst complexes with at least one complexing agent. Without the complexing agent, addition of the catalyst to the polymer solution causes gelation. This is due to the metal ion of the transition metal catalyst complexing with the polar groups on the polymeric chains. A gelled polymer is difficult to hydrogenate to a high degree. Also, a partially crosslinked polymer results. These factors cause the elastomer to be poorer in heat aging and physical properties when compared to the polymers of this invention.

In the present invention the complexing agents complex with the catalyst in order to prevent the catalyst from bonding to the pyridine ring. Thus the amount of complexing agent employed is related to the relatively low catalyst level. Generally, the mole ratio of catalyst::complexing agent is from 1:10, preferably 1:8; and most preferably 1:6.

The complexing agents for the catalysts are hexamethylphosphoric triamide, tetramethylethylenediamine, phosphines of the general formula $(R_7)_3P$, phosphites of the general formula $(R_7O)_3P$ wherein $R_7$ is an alkyl group containing from 1 to about 6 carbon atoms, a phenyl group or a substituted aromatic group wherein the substituent is an alkyl group containing from 1 to about 2 carbon atoms such as o-tolyl.

Solvents for the hydrogenation are well known in the art. An exemplary list of solvents are xylenes, toluenes, anisole, dioxane, tetrahydrofuran, hydrocarbons such as hexanes, heptanes, and octanes and chlorinated hydrocarbons such as chlorobenzene and tetrachloroethane, trisubstituted amines such as triethylamine and tetramethylethylene diamine. The temperature of hydrogenation is generally from about 25° C. to about 150° C. with from about 25° C. to about 50° C. being preferred.

Removal of the transition metal catalyst is difficult and expensive. This is due to the high molecular weight of the polymer and also that the catalyst is intimately associated with the polymer. A catalyst, when left in contact with the hydrogenated polymer, shows a degradative action. This action is discussed in a paper by Zenairo Osawa titled "Rule of Metals and Metal Deactivators in Polymer Degradation." An approach of this invention was the partial removal of the catalyst within the polymer, and also to render the residual catalyst innocuous, that is, to deactivate the catalyst by the addition of a second complexing agent after hydrogenation in the absence of air. If the catalyst is not rendered innocuous, the polymer shows poor heat aging and high oil swell. Some examples of the second complexing agents are weak organic acids containing from 1 to about 4 carbon atoms such as formic acid, acetic acid, and propionic acid; diacids containing from 2 to about 6 carbon atoms such as oxalic acid, malonic acid, succinic acid, glutaric acid, and adipic acid and also sodium or potassium salts of the above mono- or diacids; trisodium ethylene-diaminetetraacetate; amino acids of 1 to about 4 carbon atoms such as glycine, alanine, alpha-glutaric acid, beta-glutaric acid, and gamma-glutaric acid; citric acid; pyridine or substituted pyridine wherein the substituent contains 1 to 2 carbon atoms; pyridine carboxylic acids such as nicotinic acid and the corresponding sodium or potassium salts; alkyl or aromatic nitriles containing from 1 to 6 carbon atoms; substituted ureas or thioureas such as N,N-dialkyldithiocarbamate metal salts of 1 to 4 carbon atoms wherein the metal is lithium, sodium, or potassium; sodium or potassium salt of dimethylglyoxime; hexamethylphosphoric triamide; tetramethylethylenediamine; phosphines $P(R_8)_3$ and phosphites $P(OR_8)_3$ wherein $R_8$ is aliphatic of 1 to 4 carbon atoms or aromatic such as $C_6H_5$, $C_6H_4CH_3$, naphthyl; olefins such as trans-1,2-dichloroethylene; inorganic salts such as cyanides, isocyanates, thiocyanates, thiocyanides, sulfides, hydrosulfides and iodides wherein the metals are sodium or potassium as well as any mixtures thereof. A preferred second complexing agent is a solution of acetic acid and pyridine in a weight ratio of from about 7:1 to about 4:1 and most preferably of from about 6:1 to about 5:1.

Previously employed methods for catalyst removal have dealt with coagulation of the polymer solution in dilute aqueous inorganic acid and/or addition of polar organic solvents such as alcohols, ketones, or hot water/steam. When this approach was tried in the present invention, the product obtained still contained appreciable quantities of catalyst resulting in poor heat aging and high oil swell. The use of dilute aqueous inorganic acids for the present invention resulted in a product with embrittlement and partial loss of the product in the aqueous acid solution.

EXAMPLE 6

Under nitrogen, 100 grams of the product of Example 1 was dissolved in several portions in one-half gallon of dry tetrahydrofuran in a one gallon high pressure reactor equipped with a paddle stirrer. The copolymer was completely dissolved in about four hours.

Preparation of the hydrogenation catalyst solution

Under nitrogen, a solution of 8.3 grams (12 weight percent) of cobalt (II) neodecanoate in mineral spirits and 17.5 grams hexamethylphosphoric triamide was prepared and cooled by means of an ice bath to about 3° C. To this purple solution was added, drop-wise, 26.7 grams (25 weight percent, 1.9 molar solution) triethylaluminum catalyst in toluene. Evolution of gases occurred and the purple solution turned brown upon the addition of the triethylaluminum catalyst. After the addition of the triethylaluminum catalyst solution, a hydrogenation catalyst solution was stirred under nitrogen for one hour at room temperature.

The hydrogenation catalyst was then added slowly to the stirred copolymer solution under nitrogen followed by the introduction of hydrogen (500 psi). Periodically, the reactor was repressurized to 500 psi in order to compensate for hydrogen uptake by the polymer. When hydrogen uptake at room temperature ceased, the polymer solution was heated to 50° C. and the hydrogen pressure increased to 1000 psi. Again, repressurization was continued to compensate for hydrogen uptake by the polymer. After a total time of about six hours, hydrogen uptake stopped. The polymer solution was then cooled to room temperature. Excess hydrogen was vented and replaced with a nitrogen blanket. A solution of glacial acetic acid (200 grams) and pyridine (40 grams), deoxygenated by bubbling in nitrogen was then added under nitrogen to the polymer solution. After stirring for one hour at room temperature, the polymer solution was coagulated in hot (70° C.) water, filtered and dried in air (100° C., four hours), followed by drying in vacuum (80° C., 1 mm Hg, two hours).

The action of acetic acid/pyridine solution on the cobalt ions under anaerobic conditions was important in rendering the residual cobalt catalyst (intimately mixed in with the polymer) innocuous to polymer degradation. Without the acetic acid treatment, the hydrogenated polymer exhibits poor heat aging and high oil swell in hydrocarbon oils. When acetic acid/pyridine solution is added to the solution of the hydrogenated polymer in the presence of air, prior to polymer coagulation, heat aging is not improved.

The hydrogenated random copolymer of Example 6 is compounded and evaluated in a side-by-side comparison with a nitrile rubber available from Nippon-Zeon having 36 weight percent acrylonitrile. The control Example 7 and the invention Example 8 are both cured with sulfur. The evaluation is set out in Table III. All values are parts by weight.

TABLE III

| | Example 7 Control | Example 8 Present Invention |
|---|---|---|
| Stearic Acid | 1 | 1 |
| Zinc Oxide | 5 | 5 |
| Vanox ZMTI | 2 | 2 |
| Nangard 445 | 2 | 2 |
| N550 Block | 50 | 50 |
| Spider Sulfur | .2 | .2 |

TABLE III-continued

| | | |
|---|---|---|
| Methyl Tuads, TMTD | 1.5 | 1.5 |
| Ethyl Tuads, TETD | 1.5 | 1.5 |
| Santocure, CBTS | 1.0 | 1.0 |
| Nippon-Zeon Nitrile Rubber | 100.00 | |
| Product of Example 6 | | 100.00 |
| Rheometer (190° C., 3° Arc, 100 cpm, Micro Die) | | |
| ML (lbf. in) | 10.0 | 5.1 |
| MHF (lbf. in) | 58.6 | 38.6 |
| T$_s$2 (min.) | 1.5 | 0.9 |
| T' 90 (min.) | 2.7 | 1.7 |
| Cure Time (min.) | 4.0 | 4.0 |
| Cure Time (min.) | 6.0$^a$ | 6.0$^a$ |
| Original Properties (Cured at 190° C.) | | |
| Stress at 100% (psi) | 383 | 383 |
| Stress at 200% (psi) | 732 | 759 |
| Stress at 300% (psi) | 1161 | 1234 |
| Tensile Strength (psi) | 2736 | 2939 |
| Elongation, Ultimate (%) | 850 | 788 |
| Hardness, Shore A (pts) | 71 | 70 |
| Compression Set (ASTM D395, Method B, 70 hr. 150° C.) Set (%) | 90.1 | 85.1 |
| Gehman Low Temperature Torsion Test Freeze Point (°C.) | −26 | −26 |
| ASTM #3 Oil (170 hr. 150° C.) Volume Change (%) | 19 | 19 |
| Air Test Tube (70 hr. 175° C.) | | |
| Tensile, Ultimate (psi) | 2815 | 2792 |
| Tensile Change (%) | 3 | −5 |
| Elongation, Ultimate (%) | 399 | 386 |
| Elongation Change (%) | −53 | −51 |
| Hardness, Shore A (pts) | 80 | 80 |
| Hardness Change (pts) | +9 | +10 |

$^a$Tempered (4 hr, 177° C.)

The hydrogenated random copolymer of Example 6 is compounded and evaluated in a side-by-side comparison with a nitrile rubber available from Nippon/Zeon having 36 weight percent acrylonitrile. The control Example 9 and the Invention Example 10 are both cured with peroxide. The evaluation is set out in Table IV. All values are parts by weight.

TABLE IV

| | EXAMPLE 9 CONTROL | EXAMPLE 10 PRESENT INVENTION |
|---|---|---|
| Structol WB-222 | 2.0 | 2.0 |
| Stearic Acid | 1.0 | 1.0 |
| AgeRite Stalite S | 2.0 | 2.0 |
| N550 Black | 40.0 | 80.0 |
| Ricon 153D | 4.0 | 4.0 |
| Vulcup 40KE | 10.0 | 10.0 |
| Tetrono A | 0.1 | 0.1 |
| Product of Example 6 | — | 100.0 |
| Nippon Zeon Nitrile Rubber | 100.0 | — |
| Mooney Viscometer (125° C. Large Rotor) | | |
| Minimum Viscosity | 54.6 | 39.0 |
| T$_5$ (min) | >35 | >35 |
| T$_{35}$ (min) | >35 | >35 |
| Rheometer (190° C., 3° C. Arc, 100 cpm, Micro Die) | | |
| ML (lbf. in) | 12.7 | 4.9 |
| MHF (lbf. in) | 127.3 | 30.6 |
| T$_s$2 (min) | 0.9 | 1.2 |
| T' 90 (min) | 3.5 | 4.0 |
| Cure Time (min) | 4.0 | 4.0 |
| Cure Time (min) (Compression Set Buttons) | 6.0 | 6.0 |
| Cure Time (min) (Plied discs) | 4.0 | 4.0 |
| Original Properties (Cured at 190° C.) | | |
| Stress at 100% (psi) | 650 | 550 |

TABLE IV-continued

| | EXAMPLE 9 CONTROL | EXAMPLE 10 PRESENT INVENTION |
|---|---|---|
| Stress at 300% (psi) | — | 3100 |
| Tensile Strength (psi) | 3680 | 3500 |
| Elongation, Ultimate (%) | 300 | 350 |
| Hardness, Duro A (pts) | 70 | 69 |
| Gehman Low Temperature Torsion Test Freeze pt. (°C.) | −30.7 | −30.7 |
| ASTM #3 Oil (70 hr. 150° C.) | | |
| Tensile, Ultimate (%) | 3125 | 3177 |
| Tensile Change (%) | −15 | −9 |
| Elongation, Ultimate (%) | 290 | 309 |
| Elongation Change (%) | −3 | −11 |
| Hardness, Shore A (pts) | 60 | 60 |
| Hardness Change (pts) | −10 | −9 |
| Volume Change (%) | 18 | 18 |
| Air Test Tube (70 hr. 175° C.) | | |
| Tensile, Ultimate (psi) | 1756 | 1789 |
| Tensile Change (%) | −52 | −49 |
| Elongation, Ultimate (%) | 108 | 112 |
| Elongation Change (%) | −64 | −68 |
| Hardness, Shore A (pts) | 75 | 75 |
| Hardness Change (pts) | 5 | 6 |

While in accordance with the Patent Statutes, the best mode and preferred embodiment has been set forth, the scope of the invention is not limited thereto, but rather by the scope of the attached claims.

What is claimed is:

1. A method of preparing an oil resistant elastomer, which comprises;

forming, by emulsion polymerization, a random copolymer having a cis-trans 1,4 microstructure from two monomeric classes wherein the first monomeric class is a conjugated diene or branched conjugated diene or mixtures thereof containing from 4 to 8 carbon atoms and the second monomeric class is polar and is of the general formula

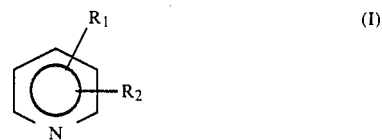

wherein $R_1$ is an alkenyl group containing from about 2 to about 8 carbon atoms, and $R_2$ is hydrogen or, an alkyl group containing from 1 to about 8 carbon atoms, with the proviso that said second monomeric class can be replaced with up to about 20 percent by weight of the general formula $CH_2=CR_3CX$ wherein $R_3$ is hydrogen or $CH_3$ and X is $-OOR_4$, $-ONR_5R_6$ or $-OOR_7OR_4$ wherein $R_4$ is an alkyl group containing from 1 to about 4 carbon atoms, $-CH_2CF_3$ or $-CH_2CF_2CF_2H$, $R_5$ and $R_6$ are independently alkyl groups containing from 1 to about 4 carbon atoms, and $R_7$ is an alkylene group containing from 1 to about 4 carbon atoms, wherein an emulsion polymerization catalyst is employed; and complexing a transition metal catalyst with a first complexing agent to form a transition metal catalyst complex; and hydrogenating said random copolymer in the presence of said transition metal catalyst complex and a trialkyl aluminum wherein the alkyl group contains from 1 to about 4 carbon atoms and further in the absence of boron trifluoride or boron trifluoride etherate; and deactivating said transition metal catalyst after hydrogenation by the use of a second complexing agent in the absence of air.

2. The method of claim 1 wherein said conjugated diene is butadiene or isoprene, $R_1$ is an alkenyl group of two to six carbon atoms and $R_2$ is hydrogen, or an alkyl group of one to six carbon atoms.

3. The method of claim 2 wherein the weight ratio of said first monomeric class:said second monomeric class is from 40-60:60-40.

4. The method of claim 3 wherein the emulsion polymerization catalyst comprises a peroxide and an iron reductant.

5. The method of claim 4 wherein the transition metal catalyst is a cobalt or nickel salt and a trialkyl-aluminum catalyst is triethylaluminum.

6. The method of claim 4 wherein the transition metal catalyst is a palladium, platinum or rhodium salt.

7. The method of claim 5 wherein the first complexing agent is hexamethylphosphoric triamide, tetramethylethylenediamine, $(R_7)_3P$, $(R_7O)_3P$ wherein $R_7$ is an alkyl group containing from 1 to about 6 carbon atoms, a phenyl, or o-tolyl group, and the second complexing agent is acetic acid-pyridine solution in a weight ratio of from about 6:1 to about 5:1.

8. The method of claim 7 wherein $R_1$ is a vinyl group and $R_2$ is hydrogen or methyl.

9. The method of claim 8 wherein the weight ratio of said first monomeric class:said second monomeric class is from 55-60:45-40.

10. The method of claim 9 wherein the second monomeric class is replaced with at least three percent by weight of $CH_2=CR_3COOR_4$.

11. The method of claim 10 wherein X is $-OOR_4$, wherein $R_4$ is an alkyl group containing 1 carbon atom.

12. The method of claim 11 wherein $R_2$ is hydrogen or methyl.

13. The method of claim 12 wherein X is $-ONR_5R_6$, wherein $R_5$ and $R_6$ are alkyl groups containing 1 carbon atom.

14. The method of claim 13 wherein the cobalt catalyst is cobalt octoate or cobalt neodecanoate.

15. The method of claim 14 wherein the peroxide is cumene hydroperoxide or paramenthane hydroperoxide.

16. A method of preparing an oil resistant elastomer, which comprises;

forming, by emulsion polymerization, a random copolymer having a cis-trans 1,4 microstructure from two monomeric classes wherein the first monomeric class is a conjugated diene or branched conjugated diene or mixtures thereof containing from four to eight carbon atoms and the second monomeric class is polar and is of the general formula

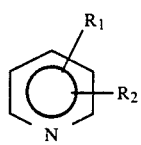 (I)

wherein $R_1$ is an alkenyl group containing from about two to about eight carbon atoms, and $R_2$ is hydrogen, an alkyl group containing from one to about eight carbon atoms, with the proviso that said second monomeric class can be replaced with up to about 20 percent by weight of the general formula $CH_2=CR_3CX$ wherein $R_3$ is hydrogen or $CH_3$ and X is $-OOR_4$, $-ONR_5R_6$, or $-OOR_7OR_4$ wherein $R_4$ is an alkyl group containing from 1 to about 4 carbon atoms, $-CH_2CF_3$ or $-CH_2CF_2CF_2H$, $R_5$ and $R_6$ are independently alkyl groups containing from one to about four carbon atoms, and $R_7$ is an alkylene group containing from 1 to about 4 carbon atoms, wherein an emulsion polymerization catalyst and a chain transfer agent composition are employed; and hydrogenating said random copolymer in the presence of a transition metal catalyst and a trialkyl aluminum wherein the alkyl group contains from 1 to about 4 carbon atoms and further in the absence of boron trifluoride or boron trifluoride etherate;

employing a first complexing agent for said transition metal catalyst; and deactivating said transition metal catalyst after hydrogenation by the use of a second complexing agent in the absence of air.

17. The method of claim 16 wherein said conjugated diene is butadiene or isoprene, $R_1$ is an alkenyl group of two to six carbon atoms and $R_2$ is hydrogen, or an alkyl group of one to six carbon atoms.

18. The method of claim 17 wherein the weight ratio of said first monomeric class:said second monomeric class is from 40-60:60-40.

19. The method of claim 18 wherein the emulsion polymerization catalyst consists of a peroxide and an iron reductant.

20. The method of claim 19 wherein the transition metal catalyst is a cobalt or nickel salt and the trialkylaluminum catalyst is triethylaluminum.

21. The method of claim 19 wherein the transition metal catalyst is a palladium, platinum or rhodium salt.

22. The method of claim 20 wherein the first complexing agent is hexamethylphosphoric triamide, tetramethylethylenediamine, $(R_7)_3P$, $(R_7O)_3P$ wherein $R_7$ is an alkyl group containing from one to about six carbon atoms, a phenyl group, or a tolyl group and the second complexing agent is acetic acid-pyridine solution in a weight ratio of from about 6:1 to about 5:1.

23. The method of claim 22 wherein $R_1$ is a vinyl group and $R_2$ is hydrogen or methyl.

24. The method of claim 23 wherein the weight ratio of said first monomeric class:said second monomeric class is from 55-60:45-40.

25. The method of claim 24 wherein the second monomeric class is replaced with at least three percent by weight of $CH_2=CR_3COOR_4$.

26. The method of claim 25 wherein the chain transfer composition comprises at least one mercaptan chain transfer agent and at least one material which is characterized by being miscible with said mercaptan, substantially insoluble in water and is non-polymerizable with said monomers.

27. The method of claim 26 wherein $R_2$ is hydrogen or methyl.

28. The method of claim 27 wherein the peroxide is cumene hydroperoxide or paramenthane hydroperoxide.

29. The method of claim 28 wherein the cobalt catalyst is cobalt octoate or cobalt neodecanoate.

30. The method of claim 29 wherein the chain transfer composition is added to the polymerization medium at the start of the polymerization reaction.

31. The method of claim 30 wherein the mercaptan is 2-mercaptoethanol.

32. The method of claim 31 wherein the non-polymerizable material in said chain transfer composition is polycaprolactones, polysilicones, esters of glycerols, esters of poly acids, sorbiton monostearate, sorbitan monooleate, or sorbital esters of fatty acids.

33. The method of claim 32 wherein X is $-OOR_4$, wherein $R_4$ is an alkyl group containing 1 carbon atom.

34. The method of claim 33 wherein X is $-ONR_5R_6$, wherein $R_5$ and $R_6$ are alkyl groups containing 1 carbon atom.

* * * * *